H. WATT.
CULTIVATING MACHINE FOR TILLING AND WEEDING LAND.
APPLICATION FILED OCT. 28, 1909.
977,911.
Patented Dec. 6, 1910.
2 SHEETS—SHEET 1.
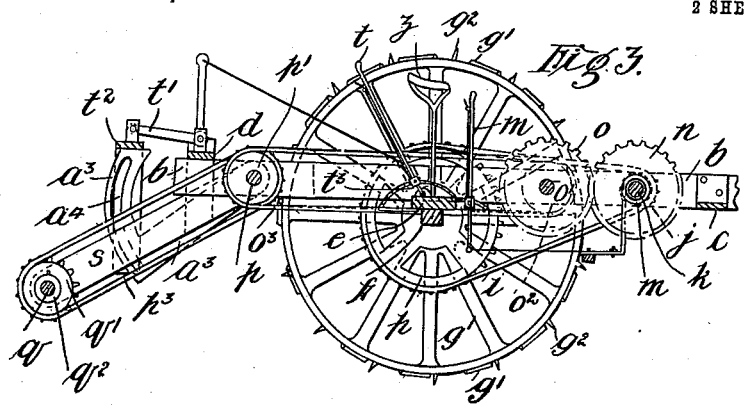
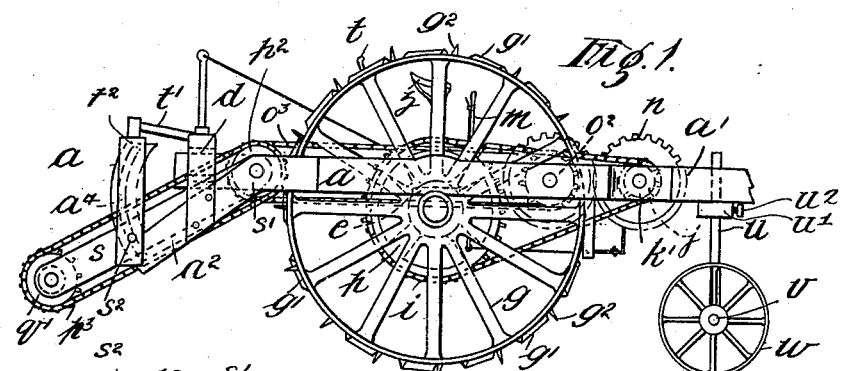
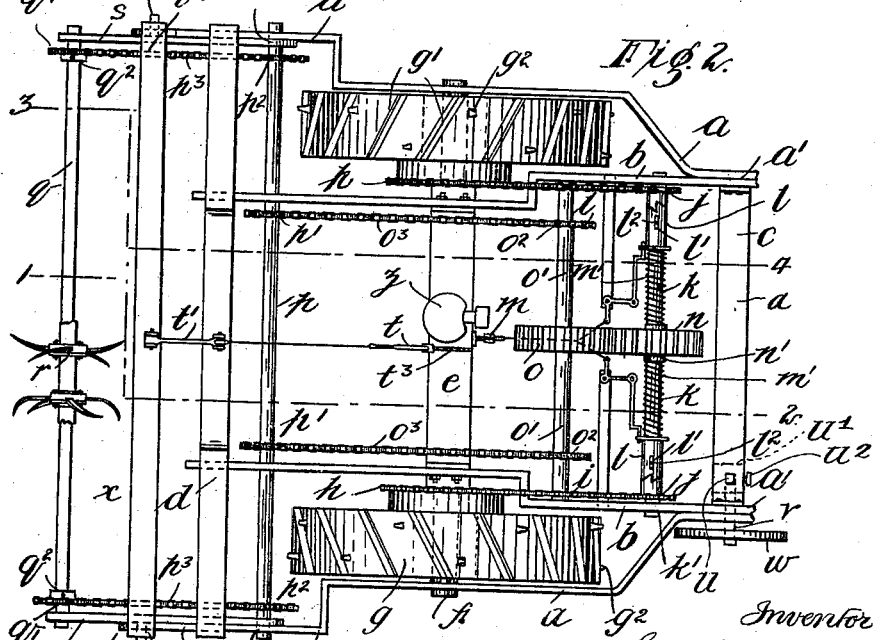

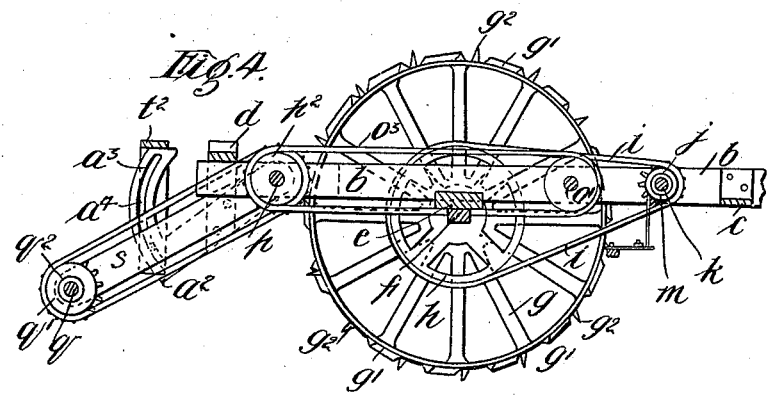

UNITED STATES PATENT OFFICE.

HUGH WATT, OF YARRAM YARRAM, VICTORIA, AUSTRALIA.

CULTIVATING-MACHINE FOR TILLING AND WEEDING LAND.

977,911.  Specification of Letters Patent.  Patented Dec. 6, 1910.

Application filed October 28, 1909. Serial No. 525,195.

*To all whom it may concern:*

Be it known that I, HUGH WATT, a subject of the King of Great Britain, residing at Commercial street, Yarram Yarram, in the State of Victoria, Australia, have invented certain new and useful Improvements in Cultivating-Machines for Tilling and Weeding Land; and I do declare the following to be a full, clear, and exact description of the invention, such as will enable others skilled in the art to which it appertains to make and use the same.

This invention has been devised to provide means for scarifying, harrowing, pulverizing and weeding land in agriculture so that the cultivation of such land may be efficiently and economically performed with a minimum amount of mechanical appliances.

In a machine embodying my invention the improvements together form a combination apparatus the special aim being to perform the various soil tilling functions above set forth with one machine in lieu of several different implements.

I would have it understood that a machine embodying my improvements may be made sufficiently small and light for a man to pull where cultivation upon a small scale only is desired and that by proportionately increasing its parts be used with horse or engine power in large field operations.

In order that the invention may be the more easily understood, reference may be made to the accompanying drawings, in which—

Figure 1 is a side elevation of a machine embodying my invention. Fig. 2 a plan thereof; Fig. 3 a sectional elevation taken on the dotted line 1—2 on Fig. 2. Fig. 4, a sectional elevation taken on the dotted line 3—4 on Fig. 2. Figs. 5 and 6 are detail views showing one of the cutter blades hereinafter to be referred to. Fig. 7 a section showing one form of device for securing the cutter blades on to the boss or hub. Figs. 8 and 9 are side and front views respectively of an alternative form of cutting blades, while Fig. 10 is a front view of the boss shown in Fig. 7 with the shanks of the blades therein.

In these drawings $a$ is an exterior framework of bar metal preferably on edge its two front members $a'$ forming the basis for attachment to shafts, or handles, or in a large machine for the pulling beam or swingle trees. These two outer members $a$ shortly after leaving the point of attachment for the beam branch outwardly to an increase in width sufficient to permit the interior mechanism to lie evenly between them. Toward the rear the said bars $a$ again proceed externally to an outward rectangle for a short distance thence return to a parallel with the first described portion and dip as at $a^2$ and rise in the form of a slotted link $a^3$, the function of the slot $a^4$ being hereinafter explained.

Attached to the inner side of the outer frame $a$ near its commencement are two somewhat corresponding carrying bars $b$—$b$ forming an inner frame running roughly in a parallel direction with the hereinbefore described outer frame $a$. The inner frame $b$—$b$ is bolted to the outer frame $a$ at its commencement at $a'$ and provided with a staunch stay beam $c$ near its front and $d$ near its back portions respectively. About the center of this inner frame $b$ a somewhat corresponding staunch beam $e$ is mounted by bolts and nuts at each end of the said members $b$—$b$ (forming the inner frame) and this beam $e$ forms the base for securing the frame to the axle $f$ of the machine to which it is stoutly bolted. This axle $f$ proceeds through the whole width of the machine and has mounted upon it at each end free running heavy driving wheels $g$ specially formed for gripping the soil of the field. These wheels $g$ form the driving media for the actively working parts hereinafter to be explained, and are provided with extended hubs on their inner sides respectively to form a spur sprocket wheel $h$ for the reception of an endless driving chain $i$. Each of these chains $i$ proceeds toward the front of the machine where they engage with small sprocket tooth pinions $j$ so that one revolution of the main driving wheels $g$ will produce a correspondingly increased number of revolutions of the differential shaft $k$ on which the sprocket pinions $j$ are set. This differential shaft $k$ bears at each end in a perforation at $k'$ through the members of the inner frame $b$ and is formed with a slipping sleeve clutch $l$ at each end, said slipping clutch sleeves $l$ being capable of disengaging from a correspondingly formed hub of the pinion wheel $j$ and of being moved into a free running position. These slipping clutches $l$—$l$ are each provided with an elongated slot $l'$ at opposite sides through which a pin $l^2$ passes said pin being secured rigidly in the shaft $k$, the clutch sleeves $l$—$l$ being respectively controlled or adjusted by a lever $m$ worked by the operator in charge. Set upon the center of this shaft $k$ and keyed to a hub $n'$ fixed thereon is mounted a strong toothed pinion $n$ and on each side of which is a coiled spring $m'$, in compression, between it and the respective clutch sleeve $l$; the toothed wheel $n$ engages with a similar wheel $o$ mounted rigidly upon a shaft $o'$ lying parallel with the shaft $k$ last mentioned, and which bears in similar manner as the aforesaid first described shaft in the inner frame $b$. Upon this second shaft $o$ is mounted, toward each end respectively, a small sprocket spur wheel $o^2$ engaging with an endless chain $o^3$ said chain proceeding toward the rear of the machine and engaging upon corresponding sprocket pinions $p'$ mounted upon a shaft $p$ parallel with those previously mentioned, viz:—transverse to the plane of movement of the machine. This last named shaft $p$ is of a greater length than those previously mentioned and bears in four points, i. e. through each of the four members $a$—$a$ and $b$—$b$ (forming the inner and outer frames) and near its ends are respectively spur sprockets $p^2$ and driving chains $p^3$ which pass over corresponding sprocket pinions $q'$ upon a tail shaft $q$. The hub of each sprocket $q'$ is provided with a cotter bolt and nut $q^2$ passing through it and the square shaft $q$ and thus making such parts easily detachable. This tail shaft $q$ carries the soil tilling cutter blades $r$ (see Figs. 5 to 10) and bears in the extreme ends respectively of a free working arm $s$ capable of swinging on its fixed bearings $s'$ upon the third or transverse shaft $p$ above described. Each of the arms $s$ respectively is provided with a rectangular projecting pin $s^2$ (see Fig. 1) which passes through and slides in the hereinbefore mentioned slotted links $a^3$. Attached to the pins $s^2$ are lever connections $t$—$t'$ and $t^2$ to raise the said arms so that the cutter blades $r$ are kept at the proper adjustment, or raised entirely from the ground, when not required. Means such as a racked arc and hand releasing pawl are provided at $t^3$ whereby the vertical set or adjustment of this tail shaft $q$ may be made. On the said tail shaft are mounted the aforesaid cutter blades $r$; these are placed preferably in sets of four, the blade projection being fastened by any approved means such for instance as being held between two dished or recessed plates $r'$ and $r^2$ (Fig. 7) screwed together to hold the radially projecting cutters $r$ in position, and tubular distance pieces $y$ being provided to fill in the predetermined gaps between the hubs $r'$ and $r^2$ of the cutters as may be required for the tillage of varying soils or for weeding functions. The blades or radially projecting cutters $r$ are set so that some of them take their pitch toward the right and some toward the left of the implement and so arranged that the sods turned over during their working will close to one another in their up-turned condition.

Under one side of the front an adjustable arm $u$ may depend preferably from the stay beam $c$ at the bottom of which said depending rod $u$ an axle $v$ may be formed on which may be mounted a free running guide wheel $w$. The arm $u$ preferably passes through a collar $u'$ secured beneath the stay-beam $c$ and is secured in position by means of a set-screw $u^2$ or otherwise; it being apparent that the position of the guide-wheel $w$ is thereby made adjustable by varying the position in which the arm $u$ is fixed by the set-screw so as to raise or lower the forward end of the apparatus and in this manner determine the depth of the cut.

I have found by experience that owing to the shape of the hook shaped radial blade cutters $r$ and the pitch at which they are set, the tendency for such blades is to go as deep in the earth as the adjustment of the lever $t$ or rollers before referred to, will permit. Referring to the main driving wheels $g$ first herein mentioned, I would have it understood that I prefer to make them of the hollow pattern well known in connection with agricultural implements, traction engines and the like, and that their tires should be broad and milled as $g'$ and provided with spikes as $g^2$ set in zig zag fashion upon the peripheral surface, said spikes $g^2$ being preferably of a semi-triangular section in elevation, the straight cut face engaging with the soil as the wheel revolves, thus forming a gripping means for the said wheel $g$ on the earth; the milling $g'$ on the surface of the face of the tire may be of any approved design, preferably of triangular pattern. The spikes $g^2$ are preferably formed at their base with a plug or shank the upper portion of which is square shouldered to engage in square perforations in the peripheral surface of the wheel $g$ while the lower portion of the shank is screw threaded with a nut and washer to set against the inner side of the tire.

Reverting to the cutter blades $r$ they are formed so that one set (Figs. 5 and 6) cut into the ground at the parts $r^4$ while the other set (Figs. 8 and 9) slice into the soil at their parts $r^5$; this action cuts, turns over, and completely breaks up the soil, and, where weeds have been the object of removal, they will be turned over and buried. As the tail axle and cutters cover a wider area than the wheels the ground is left in a finished condition. The cutting portion of the machine will not choke—as is the case with many soil tilling implements—for the reason that the earth is cut, in the peculiar manner hereinbefore set forth, in small quantities at each cutter along the line of the tail shaft.

In practice I prefer the hooked, pitched member to terminate in a widening base or foot piece, (see Fig. 10) said foot piece fitting in a corresponding gap or depression in the inner faces of the two exterior plates $r'$ and $r^2$ forming the disks or hubs of the construction, and secured together preferably by four bolts and nuts as $r^3$; these plates would have a slightly collared hub for encircling the square shaft $q$ on which they are mounted, the end ones being provided with cotter pins to hold them rigidly in position against transverse travel; the hubs of the sprocket pinions $q'$ will be removable by undoing their cotter bolts thereon, thus enabling the disks and distance pieces to be easily adjusted or regulated.

A seat $z$ is provided for the driver and covers or shields may also be added for protecting the driver, the chains, bearings or other wearing parts, from fine earth or dust arising from the operations of the cutter blades.

I claim as my invention:

1. In a cultivating machine and in combination, an outer frame having oppositely disposed sides, an upwardly extending link on each of said sides, each of said links being provided with a slot, arms pivotally mounted in said frame and adapted to swing within the same, a pin secured on each of the said arms and passed through the slot in the said link adjacent thereto, a cross bar extending between and connected to the said arms, revoluble devices carried by said arms and means for raising and lowering the said cross bar and the said arms and revoluble devices.

2. In a cultivating machine and in combination, an outer frame $a$, an inner frame $b$, driving wheels $g$ mounted between the parts of the said outer and inner frames, a differential cross shaft $k$, sleeve clutches $l$ mounted on said cross shaft, springs $m'$ for normally maintaining the parts of said clutches in engagement, means for actuating said sleeve clutches against the action of said springs, means for driving the differential cross shaft from the driving wheels, an intermediate shaft $o'$, means for driving this intermediate shaft from the said differential cross shaft, a counter shaft $p$, means for driving the counter shaft from the intermediate shaft, a tail shaft $q$, means for driving the tail shaft from the counter shaft, cutter blades secured on the said counter shaft, adjustable swinging arms in which the said tail shaft is journaled, and means for raising and lowering the said swinging arms radially.

3. In a cultivating machine and in combination, an outer frame $a$, an inner frame $b$, driving wheels $g$ mounted between the parts of the said outer and inner frames, a differential cross shaft $k$, sleeve clutches $l$ mounted on said cross shaft, springs $m'$ for normally maintaining the parts of said clutches in engagement, means for actuating said sleeve clutches against the action of said springs, means for driving the differential cross shaft from the driving wheels, an intermediate shaft $o'$, means for driving this intermediate shaft from the said differential cross shaft, a counter shaft $p$, means for driving the counter shaft from the intermediate shaft, a tail shaft $q$, means for driving the tail shaft from the counter shaft, cutter blades secured in the said counter shaft, adjustable swinging arms in which the said tail shaft is journaled and means for raising and lowering the said swinging arms radially, a running guide wheel $w$, an adjustable rod $u$ for supporting said running guide wheel, and an axle secured to the said adjustable rod and upon which the said guide wheel is mounted.

In testimony whereof I have signed my name to this specification in the presence of two subscribing witnesses.

HUGH WATT.

Witnesses:
  ALICE HARKER,
  FLORENCE SINCLAIR.